(12) United States Patent
Uehara

(10) Patent No.: US 8,148,280 B2
(45) Date of Patent: Apr. 3, 2012

(54) OPTICAL GLASS

(75) Inventor: Susumu Uehara, Sagamihara (JP)

(73) Assignee: Kabushiki Kaisha Ohara, Sagamihara-shi (JP)

( * ) Notice: Subject to any disclaimer, the term of this patent is extended or adjusted under 35 U.S.C. 154(b) by 428 days.

(21) Appl. No.: 11/817,274

(22) PCT Filed: Feb. 21, 2006

(86) PCT No.: PCT/JP2006/303532
§ 371 (c)(1),
(2), (4) Date: Aug. 28, 2007

(87) PCT Pub. No.: WO2006/093062
PCT Pub. Date: Sep. 8, 2006

(65) Prior Publication Data
US 2009/0062101 A1 Mar. 5, 2009

(30) Foreign Application Priority Data

Feb. 28, 2005 (JP) ................................. 2005-054239

(51) Int. Cl.
*C03C 3/066* (2006.01)
(52) U.S. Cl. ................. 501/79; 501/50; 501/51; 501/78
(58) Field of Classification Search ................ 501/50, 501/51, 78, 79
See application file for complete search history.

(56) References Cited

U.S. PATENT DOCUMENTS

| | | | | |
|---|---|---|---|---|
| 4,226,627 A * | 10/1980 | Inoue et al. | | 501/50 |
| 5,952,256 A * | 9/1999 | Morishita et al. | | 501/63 |
| 6,753,281 B2 * | 6/2004 | Uehara | | 501/78 |
| 6,797,659 B2 * | 9/2004 | Uehara | | 501/78 |
| 6,844,279 B2 * | 1/2005 | Hayashi et al. | | 501/50 |
| 6,912,093 B2 * | 6/2005 | Endo | | 359/642 |
| 7,138,348 B2 * | 11/2006 | Uehara | | 501/64 |
| 7,138,349 B2 * | 11/2006 | Uehara et al. | | 501/78 |
| 7,335,614 B2 * | 2/2008 | Uehara et al. | | 501/78 |
| 7,576,020 B2 * | 8/2009 | Hayashi | | 501/50 |
| 2003/0040422 A1 * | 2/2003 | Kikuchi et al. | | 501/52 |
| 2003/0100433 A1 * | 5/2003 | Hayashi et al. | | 501/79 |
| 2003/0125186 A1 * | 7/2003 | Hayashi et al. | | 501/50 |
| 2003/0211929 A1 * | 11/2003 | Hayashi et al. | | 501/78 |
| 2004/0106507 A1 * | 6/2004 | Kasuga et al. | | 501/78 |
| 2004/0116272 A1 * | 6/2004 | Uehara | | 501/78 |
| 2004/0186003 A1 * | 9/2004 | Uehara | | 501/78 |
| 2004/0220041 A1 * | 11/2004 | Isowaki et al. | | 501/78 |
| 2004/0235638 A1 * | 11/2004 | Uehara et al. | | 501/78 |
| 2005/0049135 A1 * | 3/2005 | Hayashi | | 501/78 |
| 2005/0204776 A1 * | 9/2005 | Hayashi | | 65/102 |
| 2006/0105900 A1 * | 5/2006 | Kasuga et al. | | 501/78 |

FOREIGN PATENT DOCUMENTS

| | | | |
|---|---|---|---|
| CN | 1389414 A | | 1/2003 |
| EP | 1 264 805 A1 | | 12/2002 |
| JP | 52103412 A | * | 8/1977 |
| JP | 60-221338 A | | 11/1985 |
| JP | 06305769 A | * | 11/1994 |
| JP | 2002012443 A | * | 1/2002 |
| JP | 2002-362938 A | | 12/2002 |

OTHER PUBLICATIONS

Korean Office Action dated May 30, 2008, issued in corresponding Korean Patent Application No. 10-2007-7017626.
International Search Report of PCT/JP2006/303532, date of mailing May 30, 2006.
Korean Office Action dated Sep. 3, 2009, issued in corresponding Korean Patent Application No. 10-2008-7029269.
Chinese Office Action dated Jul. 13, 2010, issued in corresponding Chinese Patent Application No. 200680006383.7.
Japanese Office Action dated Jan. 25, 2011, issued in corresponding Japanese Patent Application No. 2005-054239.
Korean Office Action dated Jun. 29, 2010, issued in corresponding Korean Patent Application No. 10-2008-7029269.
Korean Office Action dated Jun. 22, 2011, issued in corresponding Korean Patent Application No. 10-2008-7029269.
Malaysian Office Action dated Mar. 6, 2009, issued in corresponding Malaysian Patent Application No. PI 20060835.
Taiwanese Office Action dated Sep. 24, 2009, issued in corresponding Taiwanese Patent Application No. 095106346.
Chinese Office Action dated Nov. 16, 2011 issued in corresponding Chinese Patent Application No. 201110033716.8.

\* cited by examiner

*Primary Examiner* — Karl Group
*Assistant Examiner* — Elizabeth A Bolden
(74) *Attorney, Agent, or Firm* — Westerman, Hattori, Daniels & Adrian, LLP

(57) ABSTRACT

An optical glass of the present invention has optical constants of a refractive index (nd) within a range from 1.75 to 1.85 and an Abbe number (vd) within a range from 35 to 45, comprises $SiO_2$ and $B_2O_3$ as essential components and one or more components selected from the group consisting of $ZrO_2$, $Nb_2O_5$, $Ta_2O_5$ and $WO_3$, has a glass transition temperature (Tg) of 580° C. or below and has weathering resistance (surface method) of Class 1 or Class 2.

9 Claims, No Drawings

OPTICAL GLASS

TECHNICAL FIELD

This invention relates to an optical glass and, more particularly, to an optical glass having a low glass transition temperature (Tg) and high refractive index and low dispersion characteristics, and excellent chemical durability, particularly weathering resistance (surface method), and being suitable for precision press molding.

PRIOR ART

There are spherical lenses and aspherical lenses as lenses used for constituting an optical system. Many spherical lenses are produced by lapping and polishing glass pressings obtained by reheat press molding glass materials. On the other hand, aspherical lenses are mainly produced by precision press molding, i.e., the method according to which lens preforms which have been softened by heating are press molded with a mold having a high precision molding surface and the shape of the high precision molding surface of the mold is transferred to the lens preforms.

In obtaining glass moldings such as aspherical lenses by precision press molding, it is necessary to press lens preforms which have been softened by heating in a high temperature environment for transferring the shape of the high precision molding surface of the mold to the lens preforms and, therefore, the mold used for such precision press molding is subjected to a high temperature and, moreover, a high pressing force is applied to the mold. Hence, in heating and softening the lens preforms and press molding the lens preforms, the molding surface of the mold tends to be oxidized or eroded, or a release film provided on the molding surface tends to be damaged with the result that the high precision molding surface of the mold cannot be maintained or the mold itself tends to be damaged. In such a case, the mold must be replaced and, as a result, frequency of replacement of the mold increases and production of products at a low cost in a large scale thereby cannot be achieved. Accordingly, glasses used for precision press molding are desired to have the lowest possible glass transition temperature (Tg) from the standpoint of preventing such damage to the mold, maintaining the high precision molding surface of the mold for a long period of time and enabling precision press molding at a low pressing force.

In conducting precision press molding, the glass of a lens preform needs to have a mirror surface or a surface close to a mirror surface. A lens preform generally is either produced directly from molten glass by the dripping method or produced by lapping and polishing glass pieces. The dripping method is more generally employed in view of advantages in the cost and number of processing steps. The lens preform produced by the dripping method is called gob or glass gob.

Optical glasses used for precision press molding, however, have drawbacks that their chemical durability is generally so poor that fading is observed on the surface of the lens preforms made of these optical glasses with resulting difficulty in maintaining a mirror surface or a surface which is close to a mirror surface. This particularly poses a problem in storing gob after it is produced and the surface method weathering resistance in chemical durability is an important property required for optical glasses used for precision press molding.

For these reasons, from the point of view of utility for optical design, there has been a strong demand for an optical glass having high refractive index and low dispersion characteristics, a low glass transition temperature (Tg) and excellent weathering resistance (surface method).

There has particularly been a strong demand for a high refractive index and low dispersion optical glass having optical constants of refractive index (nd) within a range from 1.75 to 1.85 and Abbe number (vd) within a range from 35 to 45.

Since a high refractive index and low dispersion optical glass is very useful in the optical design, various glasses of this type have for a long time been proposed.

Japanese Patent Application Laid-open Publications No. Hei 6-305769, No. 2002-362938, No. 2003-201142, No. 2002-12443 and No. 2003-252647 disclose optical glasses having a low glass transition temperature (Tg). It has been found, however, that optical glasses which are specifically disclosed in these publications are insufficient in the weathering resistance (surface method), for reasons that a ratio of $ZnO/SiO_2$ in mass % is outside of the range of 2.8 or over, a ratio of $B_2O_3/SiO_2$ is outside of the range of 3.2 or below, and a total amount of $SiO_2$, $B_2O_3$, $La_2O_3$, $ZrO_2$, $Nb_2O_5$, $Ta_2O_5$, $WO_3$, ZnO and $Li_2O$ is outside of the range exceeding 96 mass %.

It is, therefore, an object of the present invention to provide an optical glass which has comprehensively eliminated the above described drawbacks of the prior art optical glasses and has the above described optical constants, a low glass transition temperature (Tg) and an excellent weathering resistance (surface method) and therefore is suitable for precision press molding.

DISCLOSURE OF THE INVENTION

Studies and experiments made by the inventor of the present invention for achieving the above described object of the invention have resulted in the finding, which has led to the present invention, that by adopting a composition comprising specific amounts of $SiO_2$, $B_2O_3$, $La_2O_3$, $ZrO_2$, $Nb_2O_3$, $Ta_2O_5$, $WO_3$, ZnO and $La_2O_3$ an optical glass having the above described optical constants, a low glass transition temperature (Tg), excellent weathering resistance (surface method), and being suitable for precision press molding can be obtained.

For achieving the above described object of the invention, in the first aspect of the invention, there is provided an optical glass having optical constants of a refractive index (nd) within a range from 1.75 to 1.85 and an Abbe number (vd) within a range from 35 to 45, comprising $SiO_2$ and $B_2O_3$ as essential components and one or more components selected from the group consisting of $ZrO_2$, $Nb_2O_5$, $Ta_2O_5$ and $WO_3$, having a glass transition temperature (Tg) of 580° C. or below and having weathering resistance (surface method) of Class 1 or Class 2.

In the second aspect of the invention, there is provided an optical glass having optical constants of a refractive index (nd) within a range from 1.75 to 1.85 and an Abbe number (vd) within a range from 35 to 45, comprising $SiO_2$, $B_2O_3$, $La_2O_3$, $ZrO_2$, $Nb_2O_5$, $Ta_2O_5$, $WO_3$, ZnO and $Li_2O$ as essential components, being substantially free of lead component, arsenic component and fluorine component, having a total amount of said oxides exceeding 96 mass %, having a ratio of $ZnO/SiO_2$ of 2.8 or over, having a glass transition temperature (Tg) of 580° C. or below and having weathering resistance (surface method) of Class 1 or Class 2.

In the third aspect of the invention, there is provided an optical glass as defined in the first or second aspect wherein a ratio of $B_2O_3/SiO_2$ is 3.2 or below.

In the fourth aspect of the invention, there is provided an optical glass as defined in any of the first to third aspects having a ratio of 1 ZnO/SiO$_2$ within a range from 3.3 to 3.7 and having the weathering resistance (surface method) of Class 1.

In the fifth aspect of the invention, there is provided an optical glass as defined in any of the first to fourth aspects comprising, in mass %:

| | | |
|---|---|---|
| SiO$_2$ | 6-10% | and/or |
| B$_2$O$_3$ | 12-24% | and/or |
| La$_2$O$_3$ | 26-42% | and/or |
| ZrO$_2$ | 1.5-10% | and/or |
| Nb$_2$O$_5$ | 1-10% | and/or |
| Ta$_2$O$_5$ | 1-15% | and/or |
| WO$_3$ | 1-10% | and/or |
| ZnO | 16-26% | and/or |
| Li$_2$O | 0.6-4%. | |

In the sixth aspect of the invention, there is provided an optical glass as defined in any of the first to fifth aspects comprising, in mass %:

| | | |
|---|---|---|
| Gd$_2$O$_3$ | 0-10% | and/or |
| GeO$_2$ | 0-5% | and/or |
| Al$_2$O$_3$ | 0-10% | and/or |
| TiO$_2$ | 0-10% | and/or |
| RO | 0-10% | | where RO is one or more components selected from the group consisting of MgO, CaO, SrO and BaO, and/or

| | |
|---|---|
| Sb$_2$O$_3$ | 0-1%. |

In the seventh aspect of the invention, there is provided an optical glass comprising, in mass %:

| | | |
|---|---|---|
| SiO$_2$ | 6-10% | |
| B$_2$O$_3$ | 12-24% | |
| La$_2$O$_3$ | 26-42% | |
| ZrO$_2$ | 1.5-10% | |
| Nb$_2$O$_5$ | 1-10% | |
| Ta$_2$O$_5$ | 1-15% | |
| WO$_3$ | 1-10% | |
| ZnO | 16-26% | |
| Li$_2$O | 0.6-4% | and |
| Gd$_2$O$_3$ | 0-10% | and/or |
| GeO$_2$ | 0-5% | and/or |
| Al$_2$O$_3$ | 0-10% | and/or |
| TiO$_2$ | 0-10% | and/or |
| RO | 0-10% | | where RO is one or more components selected from the group consisting of MgO, CaO, SrO and BaO, and/or

| | |
|---|---|
| Sb$_2$O$_3$ | 0-1%. |

In the eighth aspect of the invention, there is provided an optical glass as defined in any of the first to sixth aspects comprising, in mass %:

| | | |
|---|---|---|
| SiO$_2$ | 6-10% | |
| B$_2$O$_3$ | 12-24% | |
| La$_2$O$_3$ | 26-42% | |
| ZrO$_2$ | 1.5-10% | |
| Nb$_2$O$_5$ | 1-10% | |
| Ta$_2$O$_5$ | 1-15% | |
| WO$_3$ | 1-10% | |
| ZnO | 16-26% | |
| Li$_2$O | 0.6-4% | and |
| Gd$_2$O$_3$ | 0-less than 4% | and/or |
| GeO$_2$ | 0-less than 4% | and/or |
| Al$_2$O$_3$ | 0-less than 4% | and/or |
| TiO$_2$ | 0-less than 4% | and/or |
| RO | 0-less than 4% | | where RO is one or more components selected from the group consisting of MgO, CaO, SrO and BaO, and/or

| | |
|---|---|
| Sb$_2$O$_3$ | 0-1%. |

In the ninth aspect of the invention, there is provided a lens perform made of an optical glass as defined in any of the first to eighth aspects.

In the tenth aspect of the invention, there is provided an optical element formed of a lens perform as defined in the ninth aspect.

In the eleventh aspect of the invention, there is provided an optical element formed of an optical glass as defined in any of the first to eighth aspects by precision press molding.

According to the invention, there is provided an optical glass which has the above described optical constants, a low glass transition temperature (Tg) and an excellent weathering resistance (surface method) and therefore is suitable for precision press molding.

BEST MODE FOR CARRYING OUT THE INVENTION

Description will be made about components which the optical glass of the present invention can comprise. Unless otherwise described, the composition ratio of each component will be expressed in mass %.

SiO$_2$ is an indispensable component which is very effective for increasing viscosity of the glass and improving resistance to devitrification and weathering resistance (surface method) of the glass. If, however, the amount of this component is insufficient, these effects cannot be achieved sufficiently whereas if the amount of this component is excessively large, the glass transition temperature (Tg) rises and the melting property of the glass is deteriorated. Therefore, the lower limit of the amount of this component should preferably be 6%, more preferably 6.01% and, most preferably be 6.02% and the upper limit of the amount of this component should be 10%, more preferably 9% and, most preferably be 8%. SiO$_2$ can be incorporated in the glass by using, e.g., SiO$_2$ as a raw material.

In the optical glass of the present invention which is a lanthanum glass, B$_2$O$_3$ is an indispensable component as a glass forming oxide. If, however, the amount of this component is insufficient, resistance to devitrification becomes insufficient whereas if the amount of this component excessively large, weathering resistance (surface method) is deteriorated. Therefore, the lower limit of the amount of this component should preferably be 12%, more preferably 13% and, most preferably be 14% and the upper limit of this component should preferably be 24%, more preferably 22% and, most preferably be 20%. $B_2O_3$ can be incorporated in the glass by using, e.g., $H_3BO_3$ or $B_2O_3$ as a raw material . . . .

$La_2O_3$ is an indispensable component which is effective for increasing refractive index and lowering dispersion. If, however, the amount of this component is insufficient, it is difficult to maintain the optical constants within the above described values whereas if the amount of this component is excessively large, resistance to devitrification is deteriorated. Therefore, the lower limit of the amount of this component should preferably be 26%, more preferably 28% and, most preferably be 30% and the upper limit of the amount of this component should preferably be 42%, more preferably 41% and, most preferably be 40%. $La_2O_3$ can be incorporated in the glass by using, e.g., $La_2O_3$, lanthanum nitrate or its hydrate as a raw material.

$ZrO_2$ is an indispensable component which is very effective for adjusting optical constants, improving resistance to devitrification and improving weathering resistance (surface method). If, however, the amount of this component is insufficient, these effects cannot be achieved sufficiently whereas if the amount of this component is excessively large, resistance to devitrification is deteriorated and it becomes difficult to maintain the glass transition temperature (Tg) at a desired low temperature. Therefore, lower limit of the amount of this component should preferably be 1.5%, more preferably 1.55% and, most preferably be 1.6% and the upper limit of the amount of this component should preferably be 10%, more preferably 8% and, most preferably be 6%. $ZrO_2$ can be incorporated in the glass by using, e.g., $ZrO_2$ as a raw material.

$Nb_2O_5$ is effective for increasing refractive index and improving weathering resistance (surface method) and resistance to devitrification. If, however, the amount of this component is insufficient, these effects cannot be sufficiently achieved whereas if the amount of this component is excessively large, resistance to devitrification decreases rather than increases. Therefore, the lower limit of this component should preferably be 1%, more preferably 2% and, most preferably be 3% and the upper limit of the amount of this component should preferably be 10%, more preferably 9% and, most preferably, be 8%. $Nb_2O_5$ can be incorporated in the glass by using, e.g., $Nb_2O_5$ as a raw material.

$Ta_2O_5$ is an indispensable component which is very effective for increasing refractive index and, improving weathering resistance (surface method) and resistance to devitrification. If, however, the amount of this component is insufficient, these effects cannot be achieved sufficiently whereas if the amount of this component is excessively large, it becomes difficult to maintain the above described optical constants. Therefore, lower limit of the amount of this component should preferably be 1%, more preferably 2% and, most preferably be 3% and the upper limit of the amount of this component should preferably be 15%, more preferably 13% and, most preferably be 10%. $Ta_2O_5$ can be incorporated in the glass by using, e.g., $Ta_2O_5$ as a raw material.

$WO_3$ is effective for adjusting optical constants and improving resistance to devitrification. If, however, the amount of this component is insufficient, these effects cannot be achieved sufficiently whereas if the amount of this component is excessively large, resistance to devitrification and transmittance in the short wavelength region of the visible ray region are deteriorated. Therefore, the lower limit of this component should preferably be 1%, more preferably 2% and, most preferably, be 3% and the upper limit of the amount of this component should preferably be 10%, more preferably 9% and, most preferably, be 8%. $WO_3$ can be incorporated in the glass by using, e.g., $WO_3$ as a raw material.

ZnO is an indispensable component which is effective for lowering the glass transition temperature (Tg). If, however, the amount of this component is insufficient, this effect cannot be achieved sufficiently whereas if the amount of this component is excessively large, resistance to devitrification is deteriorated. Therefore, lower limit of the amount of this component should preferably be 16%, more preferably more than 20% and, most preferably be 20.5% and the upper limit of the amount of this component should preferably be 26%, more preferably 25% and, most preferably be 24%. ZnO can be incorporated in the glass by using, e.g., ZnO as a raw material.

$Li_2O$ is an indispensable component which is effective for lowering the glass transition temperature (Tg) substantially and facilitating melting of mixed glass materials. If, however, the amount of this component is insufficient, these effects cannot be achieved sufficiently whereas if the amount of this component is excessively large, resistance to devitrification is sharply deteriorated. Therefore, the lower limit of the amount of this component should preferably be 0.6%, more preferably 0.8% and, most preferably be 1% and the upper limit of the amount of this component should preferably be 4%, more preferably 3.5% and, most preferably be 3%. $Li_2O$ can be incorporated in the glass by using, e.g., $Li_2O$, $Li_2CO_3$, LiOH or $LiNO_3$ as a raw material.

$Sb_2O_3$ may be optionally added for defoaming during melting of the glass. If the amount of this component is excessive, transmittance in the short-wave region of the visible ray region is deteriorated. Therefore, the upper limit of the amount of this component should preferably be 1%, more preferably 0.8% and, most preferably, be 0.5%.

$Gd_2O_3$ is effective for increasing refractive index and lowering dispersion. If, however, the amount of this component is excessively large, resistance to devitrification and weathering resistance (surface method) are deteriorated. Therefore, the upper limit of the amount of this component should preferably be 10%, more preferably less than 4% and, most preferably be 2%. $Gd_2O_3$ can be incorporated in the glass by using, e.g., $Gd_2O_3$ as a raw material.

$GeO_2$ is effective for increasing refractive index and improving resistance to devitrification. Since, however, this component is very expensive, the upper limit of the amount of this component should preferably be 5%, more preferably less than 4% and, most preferably, be 2%. $GeO_2$ can be incorporated in the glass by using, e.g., $GeO_2$ as a raw material.

$Al_2O_3$ is effective for improving chemical durability and particularly weathering resistance (surface method). If the amount of this component is excessively large, resistance to devitrification is deteriorated. Therefore, the upper limit of this component should preferably be 10%, more preferably less than 4% and, most preferably, be 2%. $Al_2O_3$ can be incorporated in the glass by using, e.g., $Al_2O_3$ or $Al(OH)_3$.

$TiO_2$ is effective for adjusting optical constants and improving resistance to devitrification. If, however, the amount of this component is excessively large, resistance to devitrification decreases rather than increases. Therefore the upper limit of the amount of this component should preferably be 10%, more preferably less than 4% and, most preferably be 2%. $TiO_2$ can be incorporated in the glass by using, e.g., $TiO_2$ as a raw material.

RO (one or more components selected from the group consisting of MgO, CaO, SrO and BaO) is effective for adjusting optical constants. If, however, the amount of this component is excessively large, resistance to devitrification is deteriorated. Therefore, the upper limit of the amount of this component should preferably be 10%, more preferably less than 4% and, most preferably be 2%. RO can be incorporated in the glass by using, e.g., MgO, CaO, SrO or BaO, or its carbonate, nitrate or hydroxide as a raw material.

The above described raw materials used in the respective components of the glass have been cited for illustrative purpose only and raw materials which can be used for the glass of the present invention are not limited to the above described oxides etc. but can be selected from known materials in accordance with various modifications of manufacturing conditions for manufacturing the glass.

The inventor of the present invention has found that, by adjusting the ratio of amounts of $B_2O_3$ to $SiO_2$ to a predetermined range, weathering resistance (surface method) of the glass is improved. More specifically, the ratio of $B_2O_3/SiO_2$ should preferably be 3.2 or below, more preferably 3.18 or below and, most preferably be 3.17 or below.

The inventor of the present invention has found that in an optical glass having optical constants within the above described ranges, the weathering resistance (surface method) can be improved by adjusting the ratio of ZnO to $SiO_2$ to a predetermined value. More specifically, the ratio of $ZnO/SiO_2$ should preferably be 2.8 or over, and more preferably be 2.82 or over. For achieving the weathering resistance (surface method) of Class 1, the ratio of $ZnO/SiO_2$ should preferably be within a range from 3.3 to 3.7.

The inventor of the present invention has also found that in an optical glass having optical constants within the above described ranges, the weathering resistance (surface method) can be improved when the total amount of $SiO_2$, $B_2O_3$, $La_2O_3$, $ZrO_2$, $Nb_2O_5$, $Ta_2O_5$, $WO_3$, ZnO and $Li_2O$ exceeds 96 mass %. Therefore, this total amount should preferably exceed 96 mass %, more preferably 97 mass % or over and, most preferably, be 99 mass % or over.

Further, for maintaining desired optical constants and maintaining excellent weathering resistance, the total amount of $SiO_2$, $B_2O_3$, $La_2O_3$, $ZrO_2$, $Nb_2O_5$, $Ta_2O_5$, $WO_3$, ZnO and $Li_2O$, the ratio of $B_2O_3/SiO_2$ and the ratio of $ZnO/SiO_2$ should preferably be within the above described desirable ranges simultaneously.

In the present specification, "weathering resistance (surface method)" which is a property defined on the assumption that a lens preform, i.e., gob, is stored for a certain period of time before precision press molding indicates degree of fading occurring when a lens preform, i.e., gob, is exposed for a predetermined period of time in an environment in which it is stored More specifically, for measuring weathering resistance (surface method), a test piece having a polished surface of 30 mm×30 mm×3 mm is exposed in a constant temperature and constant humidity bath of 50° C., 85% relative humidity for 24 hours and then the polished surface is inspected by a microscope of 50 magnifications for observing state of fading of the polished surface. According to the standard of evaluation by this method, Class 1 indicates that no fading is observed when a test piece which has been tested for 24 hours is inspected at 6,000 luxes, Class 2 indicates that fading is not observed at 1,500 luxes but is observed at 6,000 luxes, Class 3 indicates that fading is observed at 1,500 luxes and Class 4 indicates that, when a test piece of Class 3 is further exposed in a constant temperature and constant humidity bath of 50° C., 85% relative humidity for 6 hours and then its polished surface is inspected by a microscope of 50 magnifications, fading is observed at 1,500 luxes. If no fading is observed in this further tested test piece, the test piece remains to be Class 3. This measuring method is a known method described in OHARA OPTICAL GLASS Catalog 2002J, page 13.

Weathering resistance (surface method) required for optical glass of the present invention preferably is Class 3, more preferably Class 2 and most preferably Class 1.

The glass may comprise $Lu_2O_3$, $Hf_2O_3$, $SnO_2$, $Ga_2O_3$, $Bi_2O_3$ and BeO. Since $Lu_2O_3$, $Hf_2O_3$ and $Ga_2O_3$ are expensive materials, use of these components increases the manufacturing cost and it is not practical to use these components in commercial production. As to $SnO_2$, there is likelihood that, when glass materials are melted in a platinum crucible or a melting furnace which is formed with platinum in a portion which comes into contact with molten glass, tin of $SnO_2$ is alloyed with platinum and heat resisting property of the alloyed portion is deteriorated with resulting making of a hole in the alloyed portion and leakage of the molten glass from the hole. $Bi_2O_3$ and BeO have the problem that these components adversely affect the environment and therefore impose a heavy burden to the environment. Accordingly, the upper limit of the amount of each of these components should preferably be less than 0.1%, more preferably 0.05% and, most preferably these components should not be added at all.

$Y_2O_3$ may be added as n optional component but this component has a problem of deteriorating resistance to devitrification significantly. Therefore, the upper limit of this component should preferably be less than 0.1%, more preferably 0.05% and, most preferably, should not be added at all.

Description will now be made about components which the optical glass of the present invention should not comprise.

Fluorine causes occurrence of striae in the production of a gob for a lens preform and therefore makes it difficult to produce a gob. Fluorine therefore should not be added to the optical glass of the present invention.

A lead compound not only has the problem that it tends to be fused with the mold during precision press molding, has the problem that steps must be taken for protecting the environment not only in production of the glass but also in cold processing such as polishing and waste of the glass and therefore it imposes a heavy burden to the environment. The lead compound therefore should not be added to the optical glass of the present invention.

$As_2O_3$, cadmium and thorium adversely affect the environment and therefore impose a heavy burden to the environment. These components therefore should not be added to the optical glass of the present invention.

$P_2O_5$ tends to deteriorate resistance to devitrification when it is added to the glass and, therefore, it is not preferable to add $P_2O_5$ to the optical glass of the present invention.

As to $TeO_2$, there is likelihood that, when glass materials are melted in a platinum crucible or a melting furnace which is formed with platinum in a portion which comes into contact with molten glass, tin of $TeO_2$ is alloyed with platinum and heat resisting property of the alloyed portion is deteriorated with resulting making of a hole in the alloyed portion and leakage of the molten glass from the hole. $TeO_2$ therefore should not be added to the optical glass of the present invention.

The optical glass of the present invention should preferably not comprise coloring components such as V, Cr, Mn, Fe, Co, Ni, Cu, Mo, Eu, Nd, Sm, Tb, Dy and Er. That is to say, these coloring components should not be intentionally added except for a case where these components are mixed as impurities.

Since the glass composition of the present invention is express in mass %, it cannot be directly expressed in mol %. A composition expressed in mol % of respective oxides existing in the glass composition satisfying the properties required by the present invention generally assumes the following values:

| | |
|---|---|
| $SiO_2$ | 10-20% |
| $B_2O_3$ | 20-45% |
| $La_2O_3$ | 7-17% |
| $ZrO_2$ | 1.5-10% |
| $Nb_2O_5$ | 0.5-5% |
| $Ta_2O_5$ | 0.2-3.5% |
| $WO_3$ | 0.5-5% |
| ZnO | 20-38% |
| $Li_2O$ | 2-16% and |
| $Gd_2O_3$ | 0-less than 4% and/or |
| $GeO_2$ | 0-less than 4% and/or |
| $Al_2O_3$ | 0-less than 4% and/or |
| $TiO_2$ | 0-less than 4% and/or |
| RO | 0-less than 4% | where RO is one or more components selected from the group consisting of MgO, CaO, SrO and BaO, and/or

| | |
|---|---|
| $Sb_2O_3$ | 0-0.5%. |

In the optical glass of the present invention, $SiO_2$ is an indispensable component which is very effective for increasing viscosity of the glass and improving resistance to devitrification and weathering resistance (surface method) of the glass. The upper limit of the amount of this component should preferably be 20 mol %, more preferably 17 mol % and, most preferably be 14 mol % and the lower limit of the amount of this component should be 10 mol %, more preferably 10.5 mol % and, most preferably be 11 mol %.

In the optical glass of the present invention, $B_2O_3$ is an indispensable component as a glass forming oxide and a component improving resistance to devitrification. The upper limit of the amount of this component should preferably be 45 mol %, more preferably 40 mol % and, most preferably be 35 mol % and the lower limit of this component should preferably be 20 mol %, more preferably 24 mol % and, most preferably be 26 mol %.

In the optical glass of the present invention, $La_2O_3$ is effective for increasing refractive index and lowering dispersion. The upper limit of the amount of this component should preferably be 17 mol %, more preferably 16 mol % and, most preferably be 15 mol % and the lower limit of the amount of this component should preferably be 7 mol %, more preferably 8 mol % and, most preferably be 9 mol %.

In the optical glass of the present invention, $ZrO_2$ is effective for adjusting optical constants, improving resistance to devitrification and improving weathering resistance (surface method). The upper limit of the amount of this component should preferably be 10 mol %, more preferably 8 mol % and, most preferably be 6 mol % and the lower limit of the amount of this component should preferably be 1.5 mol %, more preferably 1.55 mol % and, most preferably be 1.6 mol %.

In the optical glass of the present invention, $Nb_2O_5$ is effective for increasing refractive index and improving weathering resistance (surface method) and resistance to devitrification. The upper limit of the amount of this component should preferably be 5 mol %, more preferably 4.5 mol % and, most preferably, be 4 mol % and the lower limit of the amount of this component should preferably be 0.5 mol %, more preferably 1 mol % and, most preferably, be 1.5 mol %.

In the optical glass of the present invention, $Ta_2O_5$ is effective for increasing refractive index and improving weathering resistance (surface method) and resistance to devitrification. The upper limit of the amount of this component should preferably be 3.5 mol %, more preferably 3 mol % and, most preferably be 2.6 mol % and the lower limit of the amount of this component should preferably be 0.2 mol %, more preferably 0.5 mol % and, most preferably be 0.8 mol %.

In the optical glass of the present invention, $WO_3$ is effective for adjusting optical constants and improving resistance to devitrification. The upper limit of the amount of this component should preferably be 5 mol %, more preferably 4.5 mol % and, most preferably, be 4 mol % and the lower limit of the amount of this component should preferably be 0.5 mol % more preferably 1 mol % and, most preferably, be 1.5 mol %.

In the optical glass of the present invention, ZnO is effective for lowering the glass transition temperature (Tg). The upper limit of the amount of this component should preferably be 38 mol %, more preferably 36 mol % and, most preferably be 34 mol % and the lower limit of the amount of this component should preferably be 20 mol %, more preferably 22 mol % and, most preferably be 24 mol %.

In the optical glass of the present invention, $Li_2O$ is effective for lowering the glass transition temperature (Tg) substantially and facilitating melting of mixed glass materials. The upper limit of the amount of this component should preferably be 16 mol %, more preferably 14 mol % and, most preferably be 12 mol % and the lower limit of the amount of this component should preferably be 2 mol %, more preferably 3 mol % and, most preferably be 3.5 mol %.

In the optical glass of the present invention, $Sb_2O_3$ is effective for defoaming during melting of the glass. The upper limit of the amount of this component should preferably be 0.5 mol %, more preferably 0.3 mol % and, most preferably, be 0.1 mol %.

In the optical glass of the present invention, $Gd_2O_3$ is effective for increasing refractive index and lowering dispersion. The upper limit of the amount of this component should preferably be less than 4 mol %, more preferably 3 mol % and, most preferably be 1 mol %.

In the optical glass of the present invention, $GeO_2$ is effective for increasing refractive index and improving resistance to devitrification. The upper limit of the amount of this component should preferably be less than 4 mol % more preferably 3 mol % and, most preferably, be 1 mol %.

In the optical glass of the present invention, $Al_2O_3$ is effective for improving weathering resistance (surface method). The upper limit of the amount of this component should preferably be less than 4 mol %, more preferably 3 mol % and, most preferably, be 1 mol %.

In the optical glass of the present invention, $TiO_2$ is effective for adjusting optical constants and improving resistance to devitrification. The upper limit of the amount of this component should preferably be less than 4 mol %, more preferably 3 mol % and, most preferably be 1 mol %.

In the optical glass of the present invention, RO (one or more components selected from the group consisting of MgO, CaO, SrO and BaO) is effective for adjusting optical constants. The upper limit of the amount of this component should preferably be less than 4 mol %, more preferably 3 mol % and, most preferably be 1 mol %.

Description will now be made about the properties of the optical glass of the present invention.

As described above, the optical glass of the present invention should preferably have, from the standpoint of utility in the optical design, optical constants of a refractive index (nd) within a range from 1.75 to 1.85 and an Abbe number (vd)

within a range from 35 to 45, more preferably a refractive index (nd) within a range from 1.76 to less than 1.84 and an Abbe number (vd) within a range from 35 to 45 and, most preferably, a refractive index (nd) within a range from 1.76 to 1.84 and an Abbe number (vd) within a range from 36 to 44.

In the optical glass of the present invention, an excessively high Tg tends to cause, as described previously, deterioration in the mold in conducting precision press molding. In the optical glass of the present invention, therefore, the upper limit of Tg should preferably be 580° C., more preferably 550° C. and, most preferably, be 530° C.

Yield point At should preferably be 620° C., more preferably 610° C. and, most preferably be 580° C. or below.

In the optical glass of the present invention, for realizing a stable production by the manufacturing method to be described later, it is important to maintain liquidus temperature of the glass below 1080° C. or below. A preferable liquidus temperature is 1050° C. or below and particularly preferable liquidus temperature is 1020° C. or below because, at this liquidus temperature, the range of viscosity which enables a stable production is broadened and the melting temperature of the glass is lowered and energy consumption thereby can be reduced.

The liquidus temperature means the lowest temperature at which no crystal is observed when crushed glass specimen is put on a platinum plate, held in a furnace with temperature graduations for 30 minutes and thereafter is taken out of the furnace and, after cooling, presence or absence of crystals in the softened glass is observed with a microscope.

As described previously, the optical glass of the present invention can be used as a preform for press molding or, alternatively, molten glass can be directly pressed. In a case where it is used as a preform, the method for manufacturing the preform and the manner of precision press molding are not particularly limited but known manufacturing method and known precision press molding method can be used. As a method for manufacturing a preform, a preform can be made in a manner as described in the gob forming method disclosed in Japanese Patent Application Laid-open Publication No. Hei 8-319124 or a preform can be made directly from molten glass as described in the manufacturing method and apparatus of an optical glass disclosed in Japanese Patent Application Laid-open Publication No. Hei 8-73229. A preform can also be made by cold processing a strip material.

In a case where a preform is made by dripping molten glass by using the optical glass of the present invention, if viscosity of the molten glass is too low, striae tends to occur in the preform whereas if viscosity is too high, cutting of glass by weight and surface tension of dripping glass becomes difficult.

Accordingly, for producing a high-quality preform stably, logarithm log η of viscosity (Pa·s) should preferably be within a range from 0.4 to 2.0, more preferably within a range from 0.5 to 1.8 and, most preferably be within a range from 0.6 to 1.6.

Although the method of precision press molding a preform is not limited, a method as disclosed in Japanese Patent Application Laid-open Publication No. Sho 62-41180, Method for Forming an Optical Element, may for example be used.

EXAMPLES

Examples of the present invention will now be described though the present invention in no way is limited by these examples.

Tables 1 to 10 show compositions of Example No. 1 to No. 47 of the optical glass of the present invention together with their refractive index (nd), Abbe number (vd), glass transition temperature (Tg), yield point (At) and weathering resistance (surface method). In the tables, composition of the respective components are expressed in mass %.

Table 11 shows compositions of optical glasses of Comparative Example A to C together with their refractive index (nd), Abbe number (vd), glass transition temperature (Tg), yield point (At) and weathering resistance (surface method),

TABLE 1

| | Example No. | | | | |
|---|---|---|---|---|---|
| | 1 | 2 | 3 | 4 | 5 |
| $SiO_2$ | 6.547 | 6.097 | 6.067 | 6.038 | 6.067 |
| $B_2O_3$ | 19.140 | 19.290 | 19.194 | 19.098 | 19.194 |
| $La_2O_3$ | 34.383 | 36.482 | 36.300 | 36.121 | 34.311 |
| $ZrO_2$ | 3.698 | 3.698 | 3.680 | 3.662 | 5.669 |
| $Nb_2O_5$ | 5.997 | 6.997 | 6.962 | 6.927 | 6.962 |
| $Ta_2O_5$ | 3.998 | 3.998 | 3.978 | 3.958 | 3.978 |
| $WO_3$ | 6.697 | 3.898 | 3.879 | 3.859 | 3.879 |
| ZnO | 18.491 | 17.491 | 17.404 | 17.318 | 17.404 |
| $Li_2O$ | 1.000 | 1.999 | 2.486 | 2.969 | 2.486 |
| $Sb_2O_3$ | 0.050 | 0.050 | 0.050 | 0.049 | 0.050 |
| total amount | 100.000 | 100.000 | 100.000 | 100.000 | 100.000 |
| $ZnO/SiO_2$ | 2.824 | 2.869 | 2.869 | 2.868 | 2.869 |
| $B_2O_3/SiO_2$ | 2.924 | 3.164 | 3.164 | 3.163 | 3.164 |
| $SiO_2 + B_2O_3 + La_2O_3 + ZrO_2 + Nb_2O_5 + Ta_2O_5 + WO_3 + ZnO + Li_2O$ | 99.950 | 99.950 | 99.950 | 99.950 | 99.950 |
| $n_d$ | 1.80477 | 1.80396 | 1.80122 | 1.79844 | 1.80371 |
| $v_d$ | 40.4 | 41.0 | 41.0 | 41.1 | 40.7 |
| Tg (° C.) | 563 | 536 | 525 | 515 | 524 |
| At (° C.) | 600 | 575 | 566 | 553 | 566 |
| weathering resistance (surface method) | 2 | 2 | 2 | 2 | 2 |

TABLE 2

| | Example No. | | | | |
|---|---|---|---|---|---|
| | 6 | 7 | 8 | 9 | 10 |
| $SiO_2$ | 6.067 | 6.067 | 6.067 | 6.022 | 6.058 |
| $B_2O_3$ | 19.194 | 19.194 | 19.194 | 18.626 | 17.893 |
| $La_2O_3$ | 35.306 | 34.311 | 35.306 | 35.420 | 34.418 |
| $ZrO_2$ | 3.680 | 3.680 | 3.680 | 3.590 | 3.489 |
| $Nb_2O_5$ | 7.956 | 6.962 | 6.962 | 6.793 | 6.601 |
| $Ta_2O_5$ | 3.978 | 5.967 | 3.978 | 3.882 | 3.772 |
| $WO_3$ | 3.879 | 3.879 | 4.873 | 3.785 | 3.678 |
| ZnO | 17.404 | 17.404 | 17.404 | 19.893 | 22.159 |
| $Li_2O$ | 2.486 | 2.486 | 2.486 | 1.941 | 1.886 |
| $Sb_2O_3$ | 0.050 | 0.050 | 0.050 | 0.049 | 0.047 |
| total amount | 100.000 | 100.000 | 100.000 | 100.000 | 100.000 |
| $ZnO/SiO_2$ | 2.869 | 2.869 | 2.869 | 3.303 | 3.658 |
| $B_2O_3/SiO_2$ | 3.164 | 3.164 | 3.164 | 3.093 | 2.954 |
| $SiO_2 + B_2O_3 + La_2O_3 + ZrO_2 + Nb_2O_5 + Ta_2O_5 + WO_3 + ZnO + Li_2O$ | 99.950 | 99.950 | 99.950 | 99.951 | 99.953 |
| $n_d$ | 1.80366 | 1.80191 | 1.80136 | 1.80502 | 1.80582 |
| $v_d$ | 40.5 | 40.7 | 40.8 | 40.8 | 40.6 |

TABLE 2-continued

| | Example No. | | | | |
|---|---|---|---|---|---|
| | 6 | 7 | 8 | 9 | 10 |
| Tg (° C.) | 525 | 525 | 523 | 530 | 525 |
| At (° C.) | 567 | 568 | 564 | 570 | 566 |
| weathering resistance (surface method) | 2 | 2 | 2 | 1 | 1 |

TABLE 3

| | Example No. | | | | |
|---|---|---|---|---|---|
| | 11 | 12 | 13 | 14 | 15 |
| $SiO_2$ | 6.067 | 6.067 | 6.067 | 6.067 | 6.067 |
| $B_2O_3$ | 19.194 | 19.194 | 19.194 | 17.702 | 19.194 |
| $La_2O_3$ | 38.289 | 37.295 | 38.289 | 39.781 | 34.311 |
| $ZrO_2$ | 1.691 | 3.680 | 3.680 | 3.680 | 3.680 |
| $Nb_2O_5$ | 6.962 | 5.967 | 4.973 | 4.973 | 5.967 |
| $Ta_2O_5$ | 3.978 | 3.978 | 3.978 | 3.978 | 6.962 |
| $WO_3$ | 3.879 | 3.879 | 3.879 | 3.879 | 3.879 |
| ZnO | 17.404 | 17.404 | 17.404 | 17.404 | 17.404 |
| $Li_2O$ | 2.486 | 2.486 | 2.486 | 2.486 | 2.486 |
| $Sb_2O_3$ | 0.050 | 0.050 | 0.050 | 0.050 | 0.050 |
| total amount | 100.000 | 100.000 | 100.000 | 100.000 | 100.000 |
| $ZnO/SiO_2$ | 2.869 | 2.869 | 2.869 | 2.869 | 2.869 |
| $B_2O_3/SiO_2$ | 3.164 | 3.164 | 3.164 | 2.918 | 3.164 |
| $SiO_2 + B_2O_3 + La_2O_3 + ZrO_2 + Nb_2O_5 + Ta_2O_5 + WO_3 + ZnO + Li_2O$ | 99.950 | 99.950 | 99.950 | 99.950 | 99.950 |
| $n_d$ | 1.79886 | 1.79899 | 1.79649 | 1.80550 | 1.79982 |
| $v_d$ | 41.4 | 41.7 | 42.2 | 41.6 | 41.0 |
| Tg (° C.) | 525 | 524 | 523 | 523 | 524 |
| At (° C.) | 566 | 564 | 563 | 564 | 567 |
| weathering resistance (surface method) | 2 | 2 | 2 | 2 | 2 |

TABLE 4

| | Example No. | | | | |
|---|---|---|---|---|---|
| | 16 | 17 | 18 | 19 | 20 |
| $SiO_2$ | 6.067 | 6.067 | 6.067 | 6.058 | 6.058 |
| $B_2O_3$ | 19.194 | 19.194 | 18.448 | 17.893 | 17.893 |
| $La_2O_3$ | 32.322 | 31.328 | 32.074 | 35.361 | 30.646 |
| $ZrO_2$ | 3.680 | 3.680 | 3.680 | 3.489 | 3.489 |
| $Nb_2O_5$ | 5.967 | 5.967 | 5.967 | 5.658 | 5.658 |
| $Ta_2O_5$ | 8.951 | 8.951 | 8.951 | 3.772 | 8.487 |
| $WO_3$ | 3.879 | 4.873 | 4.873 | 3.678 | 3.678 |
| ZnO | 17.404 | 17.404 | 17.404 | 22.159 | 22.159 |
| $Li_2O$ | 2.486 | 2.486 | 2.486 | 1.886 | 1.886 |
| $Sb_2O_3$ | 0.050 | 0.050 | 0.050 | 0.047 | 0.047 |
| total amount | 100.000 | 100.000 | 100.000 | 100.000 | 100.000 |
| $ZnO/SiO_2$ | 2.869 | 2.869 | 2.869 | 3.658 | 3.658 |
| $B_2O_3/SiO_2$ | 3.164 | 3.164 | 3.041 | 2.954 | 2.954 |
| $SiO_2 + B_2O_3 + La_2O_3 + ZrO_2 + Nb_2O_5 + Ta_2O_5 + WO_3 + ZnO + Li_2O$ | 99.950 | 99.950 | 99.950 | 99.953 | 99.953 |
| $n_d$ | 1.80049 | 1.80026 | 1.80504 | 1.80326 | 1.80503 |
| $v_d$ | 40.7 | 40.3 | 40.1 | 41.1 | 40.3 |
| Tg (° C.) | 524 | 522 | 524 | 524 | 518 |
| At (° C.) | 568 | 565 | 565 | 568 | 561 |
| weathering resistance (surface method) | 2 | 2 | 2 | 1 | 1 |

TABLE 5

| | Example No. | | | | |
|---|---|---|---|---|---|
| | 21 | 22 | 23 | 24 | 25 |
| $SiO_2$ | 6.058 | 6.058 | 6.058 | 6.058 | 6.058 |
| $B_2O_3$ | 17.893 | 17.893 | 17.893 | 17.186 | 17.469 |
| $La_2O_3$ | 31.589 | 32.532 | 30.646 | 31.353 | 31.070 |
| $ZrO_2$ | 3.489 | 3.489 | 3.489 | 3.489 | 3.489 |
| $Nb_2O_5$ | 4.715 | 3.772 | 4.715 | 4.715 | 4.715 |
| $Ta_2O_5$ | 8.487 | 8.487 | 8.487 | 8.487 | 8.487 |
| $WO_3$ | 3.678 | 3.678 | 4.620 | 4.620 | 4.620 |
| ZnO | 22.159 | 22.159 | 22.159 | 22.159 | 22.159 |
| $Li_2O$ | 1.886 | 1.886 | 1.886 | 1.886 | 1.886 |
| $Sb_2O_3$ | 0.047 | 0.047 | 0.047 | 0.047 | 0.047 |
| total amount | 100.000 | 100.000 | 100.000 | 100.000 | 100.000 |
| $ZnO/SiO_2$ | 3.658 | 3.658 | 3.658 | 3.658 | 3.658 |
| $B_2O_3/SiO_2$ | 2.954 | 2.954 | 2.954 | 2.837 | 2.884 |
| $SiO_2 + B_2O_3 + La_2O_3 + ZrO_2 + Nb_2O_5 + Ta_2O_5 + WO_3 + ZnO + Li_2O$ | 99.953 | 99.953 | 99.953 | 99.953 | 99.953 |
| $n_d$ | 1.80267 | 1.80044 | 1.80286 | 1.80752 | 1.80561 |
| $v_d$ | 40.7 | 41.3 | 40.6 | 40.3 | 40.3 |
| Tg (° C.) | 517 | 518 | 516 | 518 | 518 |
| At (° C.) | 560 | 559 | 558 | 560 | 560 |
| weathering resistance (surface method) | 1 | 1 | 1 | 1 | 1 |

TABLE 6

| | Example No. | | | | |
|---|---|---|---|---|---|
| | 26 | 27 | 28 | 29 | 30 |
| $SiO_2$ | 6.058 | 6.058 | 6.068 | 6.560 | 6.580 |
| $B_2O_3$ | 17.893 | 17.327 | 17.172 | 16.640 | 16.710 |
| $La_2O_3$ | 32.060 | 31.683 | 32.404 | 32.340 | 32.470 |
| $ZrO_2$ | 3.489 | 3.489 | 3.496 | 3.490 | 3.500 |
| $Nb_2O_5$ | 4.243 | 4.243 | 3.779 | 3.770 | 3.790 |
| $Ta_2O_5$ | 8.487 | 8.487 | 8.503 | 8.480 | 8.500 |
| $WO_3$ | 3.678 | 4.620 | 4.629 | 4.620 | 4.640 |
| ZnO | 22.159 | 22.159 | 22.201 | 22.160 | 22.240 |
| $Li_2O$ | 1.886 | 1.886 | 1.701 | 1.890 | 1.520 |
| $Sb_2O_3$ | 0.047 | 0.047 | 0.047 | 0.050 | 0.050 |
| total amount | 100.000 | 100.000 | 100.000 | 100.000 | 100.000 |
| $ZnO/SiO_2$ | 3.658 | 3.658 | 3.659 | 3.378 | 3.380 |
| $B_2O_3/SiO_2$ | 2.954 | 2.860 | 2.830 | 2.537 | 2.540 |
| $SiO_2 + B_2O_3 + La_2O_3 + ZrO_2 +$ | 99.953 | 99.953 | 99.952 | 99.950 | 99.950 |

TABLE 6-continued

| | Example No. | | | | |
|---|---|---|---|---|---|
| | 26 | 27 | 28 | 29 | 30 |
| Nb$_2$O$_5$ + Ta$_2$O$_5$ + WO$_3$ + ZnO + Li$_2$O | | | | | |
| n$_d$ | 1.80105 | 1.80519 | 1.80676 | 1.80548 | 1.80743 |
| ν$_d$ | 41.1 | 40.5 | 40.7 | 40.6 | 40.6 |
| Tg (° C.) | 517 | 515 | 523 | 520 | 525 |
| At (° C.) | 562 | 558 | 564 | 562 | 570 |
| weathering resistance (surface method) | 1 | 1 | 1 | 1 | 1 |

TABLE 7

| | Example No. | | | | |
|---|---|---|---|---|---|
| | 31 | 32 | 33 | 34 | 35 |
| SiO$_2$ | 6.560 | 6.580 | 6.580 | 6.580 | 6.580 |
| B$_2$O$_3$ | 16.640 | 17.010 | 17.010 | 17.010 | 17.010 |
| La$_2$O$_3$ | 31.340 | 32.170 | 31.170 | 32.170 | 32.170 |
| ZrO$_2$ | 3.490 | 3.500 | 3.500 | 3.500 | 3.500 |
| Nb$_2$O$_5$ | 3.770 | 3.790 | 3.790 | 3.790 | 3.790 |
| Ta$_2$O$_5$ | 9.480 | 8.500 | 9.500 | 6.500 | 5.500 |
| WO$_3$ | 4.620 | 4.640 | 4.640 | 6.640 | 7.640 |
| ZnO | 22.160 | 22.240 | 22.240 | 22.240 | 22.240 |
| Li$_2$O | 1.890 | 1.520 | 1.520 | 1.520 | 1.520 |
| Sb$_2$O$_3$ | 0.050 | 0.050 | 0.050 | 0.050 | 0.050 |
| total amount | 100.000 | 100.000 | 100.000 | 100.000 | 100.000 |
| ZnO/SiO$_2$ | 3.378 | 3.380 | 3.380 | 3.380 | 3.380 |
| B$_2$O$_3$/SiO$_2$ | 2.537 | 2.585 | 2.585 | 2.585 | 2.585 |
| SiO$_2$ + B$_2$O$_3$ + La$_2$O$_3$ + ZrO$_2$ + Nb$_2$O$_5$ + Ta$_2$O$_5$ + WO$_3$ + ZnO + Li$_2$O | 99.950 | 99.950 | 99.950 | 99.950 | 99.950 |
| n$_d$ | 1.80582 | 1.80561 | 1.80587 | 1.80504 | 1.80473 |
| ν$_d$ | 40.5 | 40.7 | 40.5 | 40.5 | 40.4 |
| Tg (° C.) | 519 | 531 | 530 | 536 | 539 |
| At (° C.) | 561 | 572 | 570 | 571 | 573 |
| weathering resistance (surface method) | 1 | 1 | 1 | 1 | 1 |

TABLE 8

| | Example No. | | | | |
|---|---|---|---|---|---|
| | 36 | 37 | 38 | 39 | 40 |
| SiO$_2$ | 6.580 | 6.580 | 6.560 | 6.560 | 6.560 |
| B$_2$O$_3$ | 17.010 | 17.010 | 16.640 | 16.940 | 16.540 |
| La$_2$O$_3$ | 32.170 | 32.170 | 34.340 | 33.040 | 34.140 |
| ZrO$_2$ | 3.500 | 3.500 | 3.490 | 3.490 | 3.490 |
| Nb$_2$O$_5$ | 3.790 | 3.790 | 3.770 | 4.770 | 3.770 |
| Ta$_2$O$_5$ | 6.000 | 5.000 | 6.480 | 6.480 | 6.480 |
| WO$_3$ | 6.640 | 7.640 | 4.620 | 4.620 | 4.920 |
| ZnO | 22.740 | 22.740 | 22.160 | 22.160 | 22.160 |
| Li$_2$O | 1.520 | 1.520 | 1.890 | 1.890 | 1.890 |
| Sb$_2$O$_3$ | 0.050 | 0.050 | 0.050 | 0.050 | 0.050 |
| total amount | 100.000 | 100.000 | 100.000 | 100.000 | 100.000 |
| ZnO/SiO$_2$ | 3.456 | 3.456 | 3.378 | 3.378 | 3.378 |
| B$_2$O$_3$/SiO$_2$ | 2.585 | 2.585 | 2.537 | 2.582 | 2.521 |
| SiO$_2$ + B$_2$O$_3$ + La$_2$O$_3$ + ZrO$_2$ + Nb$_2$O$_5$ + Ta$_2$O$_5$ + WO$_3$ + ZnO + Li$_2$O | 99.950 | 99.950 | 99.950 | 99.950 | 99.950 |
| n$_d$ | 1.80415 | 1.80378 | 1.80497 | 1.80547 | 1.80554 |
| ν$_d$ | 40.6 | 40.4 | 41.1 | 40.7 | 41.1 |
| Tg (° C.) | 532 | 530 | 524 | 521 | 523 |
| At (° C.) | 573 | 568 | 565 | 564 | 566 |
| weathering resistance (surface method) | 1 | 1 | 1 | 1 | 1 |

TABLE 9

| | Example No. | | | | |
|---|---|---|---|---|---|
| | 41 | 42 | 43 | 44 | 45 |
| SiO$_2$ | 6.560 | 6.580 | 6.580 | 6.580 | 6.560 |
| B$_2$O$_3$ | 16.540 | 16.910 | 16.910 | 16.710 | 16.540 |
| La$_2$O$_3$ | 35.440 | 33.270 | 34.270 | 33.470 | 32.140 |
| ZrO$_2$ | 3.490 | 3.500 | 3.500 | 3.500 | 3.490 |
| Nb$_2$O$_5$ | 3.770 | 3.790 | 3.790 | 3.790 | 3.770 |
| Ta$_2$O$_5$ | 5.480 | 5.500 | 4.500 | 5.500 | 6.480 |
| WO$_3$ | 4.620 | 6.640 | 6.640 | 6.640 | 6.920 |
| ZnO | 22.160 | 22.240 | 22.240 | 21.940 | 22.160 |
| Li$_2$O | 1.890 | 1.520 | 1.520 | 1.820 | 1.890 |
| Sb$_2$O$_3$ | 0.050 | 0.050 | 0.050 | 0.050 | 0.050 |
| total amount | 100.000 | 100.000 | 100.000 | 100.000 | 100.000 |
| ZnO/SiO$_2$ | 3.378 | 3.380 | 3.380 | 3.334 | 3.378 |
| B$_2$O$_3$/SiO$_2$ | 2.521 | 2.570 | 2.570 | 2.540 | 2.521 |
| SiO$_2$ + B$_2$O$_3$ + La$_2$O$_3$ + ZrO$_2$ + Nb$_2$O$_5$ + Ta$_2$O$_5$ + WO$_3$ + ZnO + Li$_2$O | 99.950 | 99.950 | 99.950 | 99.950 | 99.950 |
| n$_d$ | 1.80515 | 1.80547 | 1.80539 | 1.80518 | 1.80586 |
| ν$_d$ | 41.2 | 40.6 | 40.9 | 40.7 | 40.4 |
| Tg (° C.) | 524 | 531 | 531 | 527 | 524 |
| At (° C.) | 566 | 574 | 573 | 566 | 564 |
| weathering resistance (surface method) | 1 | 1 | 1 | 1 | 1 |

TABLE 10

| | Example No. | |
|---|---|---|
| | 46 | 47 |
| SiO$_2$ | 6.560 | 6.560 |
| B$_2$O$_3$ | 16.440 | 16.440 |
| La$_2$O$_3$ | 33.240 | 32.240 |
| ZrO$_2$ | 3.490 | 3.490 |
| Nb$_2$O$_5$ | 3.770 | 3.770 |
| Ta$_2$O$_5$ | 7.480 | 6.480 |
| WO$_3$ | 4.920 | 6.920 |
| ZnO | 21.960 | 21.960 |
| Li$_2$O | 2.090 | 2.090 |
| Sb$_2$O$_3$ | 0.050 | 0.050 |
| total amount | 100.000 | 100.000 |

TABLE 10-continued

|  | Example No. | |
| --- | --- | --- |
|  | 46 | 47 |
| $ZnO/SiO_2$ | 3.348 | 3.348 |
| $B_2O_3/SiO_2$ | 2.506 | 2.506 |
| $SiO_2 + B_2O_3 + La_2O_3 + ZrO_2 + Nb_2O_5 + Ta_2O_5 + WO_3 + ZnO + Li_2O$ | 99.950 | 99.950 |
| $n_d$ | 1.80544 | 1.80532 |
| $v_d$ | 40.7 | 40.3 |
| Tg (° C.) | 522 | 521 |
| At (° C.) | 564 | 560 |
| weathering resistance (surface method) | 1 | 1 |

TABLE 11

|  | Comparative Example No. | | |
| --- | --- | --- | --- |
|  | A | B | C |
| $SiO_2$ | 1.000 | 3.000 | 4.500 |
| $B_2O_3$ | 21.000 | 19.500 | 16.700 |
| $La_2O_3$ | 27.000 | 15.000 | 24.200 |
| $Gd_2O_3$ | 8.000 | 10.000 | 12.000 |
| $ZrO_2$ | 4.000 | 4.000 | 3.800 |
| $Nb_2O_5$ | 2.000 | 2.000 | 1.100 |
| $Ta_2O_5$ | 8.000 | 8.000 | 8.800 |
| $WO_3$ | 7.000 | 7.000 | 5.700 |
| ZnO | 20.000 | 30.500 | 21.500 |
| $Li_2O$ | 2.000 | 1.000 | 1.800 |
| total amount | 100.000 | 100.000 | 100.100 |
| $ZnO/SiO_2$ | 20.000 | 10.167 | 4.778 |
| $B_2O_3/SiO_2$ | 21.000 | 6.500 | 3.711 |
| $SiO_2 + B_2O_3 + La_2O_3 + ZrO_2 + Nb_2O_5 + Ta_2O_5 + WO_3 + ZnO + Li_2O$ | 92.000 | 90.000 | 88.000 |
| $n_d$ | 1.80840 | 1.79469 | 1.80968 |
| $v_d$ | 41.1 | 40.4 | 41.5 |
| Tg (° C.) | 519 | 531 | 525 |
| At (° C.) | 556 | 566 | 564 |
| weathering resistance (surface method) | 3 | 3 | 3 |

For manufacturing the glasses of Example No. 1 to No. 47 shown in Tables 1 to 10, ordinary raw materials for an optical glass including oxides, carbonates and nitrates were weighed and mixed so as to realize the composition ratio of the respective examples shown in Tables 1 to 10. The raw materials were put in a platinum crucible and melted at a temperature within a range from 1000° C. to 1300° C. for three to five hours depending upon the melting property of the composition. After refining and stirring the melt for homogenization, the melt was cast into a mold and annealed to provide the glasses.

Refractive index (nd) and Abbe number (vd) of the glasses were measured with respect to glasses which were obtained by setting the rate of lowering of annealing temperature at −25° C./Hr.

Glass transition temperature (Tg) of the glasses was measured in accordance with the Japan Optical Glass Industry Standard JOGIS08$^{-2003}$ "Measuring Method of Thermal Expansion of Optical Glass". A specimen having length of 50 mm and diameter of 4 mm was used as a test specimen.

Yield point (At) was measured in the same manner as in measuring glass transition temperature (Tg), and a temperature at which stretching of the glass ceased and shrinking of the glass started was adopted as yield point.

Weathering resistance (surface method) was determined by conducting the following test.

A test piece having a polished surface of 30 mm×30 mm×3 mm was exposed in a constant temperature and constant humidity bath of 50° C., 85% relative humidity for 24 hours and then the polished surface was inspected by a microscope of 50 magnifications for observing state of fading of the polished surface. In this method, Class 1 indicates that no fading is observed when a test piece which has been tested for 24 hours is inspected at 6,000 luxes, Class 2 indicates that fading is not observed at 1,500 luxes but is observed at 6,000 luxes, Class 3 indicates that fading is observed at 1,500 luxes and Class 4 indicates that, when a test piece of Class 3 is further exposed in a constant temperature and constant humidity bath of 50° C., 85% relative humidity for 6 hours and then its polished surface is inspected by a microscope of 50 magnifications, fading is observed at 1,500 luxes. If no fading is observed in this further tested test piece, the test piece remains to be Class 3.

As shown in Tables 1 to 10, the optical glasses of Example No. 1 to No. 47 all have the optical constants (refractive index (nd) and Abbe number (vd) of the above described ranges and their glass transition temperature (Tg) is 580° C. or below and, therefore, they are suitable for precision press molding. They have also excellent weathering resistance (surface method) and, therefore, have excellent chemical durability.

On the other hand, the specimens of Comparative Example A to C shown in Table 11 were manufactured under the same conditions as the examples of the present invention were manufactured and the manufactured glasses were evaluated by the same evaluation methods as used for evaluating the examples of the present invention. In Comparative Example A to C, the ratio of $B_2O_3/SiO_2$ exceeded 3.2 and, therefore, they have poor weathering resistance (surface method).

INDUSTRIAL APPLICABILITY

As described above, the optical glass of the present invention which is of a $SiO_2$—$B_2O_3$—$La_2O_3$—$ZrO_2$—$Nb_2O_5$—$Ta_2O_5$—$WO_3$—ZnO—$Li_2O$ glass is free of Pb, As and F and has optical constants of a refractive index (nd) within a range from 1.75 to 1.85 and an Abbe number (vd) within a range from 35 to 45 and glass transition temperature (Tg) of 580° C. or below and hence is suitable for precision press molding and has sufficient industrial utility.

Moreover, since the optical glass of the present invention has excellent weathering resistance (surface method), in a case where a lens preform, i.e., gob, is stored before precision press molding, there is no likelihood of occurrence of fading due to exposure of the gob for a certain period of time during storage and, therefore, the optical glass can be very easily treated.

The invention claimed is:

1. An optical glass comprising:
   $SiO_2$, $B_2O_3$, $La_2O_3$, $ZrO_2$, $Nb_2O_5$, $Ta_2O_5$, $WO_3$, ZnO, and $Li_2O$ being substantially free of lead component, arsenic component and fluorine component, having a total amount of said oxides exceeding 96 mass %,
   wherein the optical glass contains $SiO_2$ from 6% to 10%, having a ratio of $ZnO/SiO_2$ of 3.303 or over,
   wherein the optical glass has a glass transition temperature (Tg) of 580° C. or below and having weathering resistance (surface method) of Class 1 or Class 2, and
   wherein the optical glass has optical constants of a refractive index (nd) within a range from 1.75 to 1.85 and an Abbe number (vd) within a range from 35 to 45.

2. The optical glass as defined in claim 1 wherein a ratio of $B_2O_3/SiO_2$ is 3.2 or below.

3. The optical glass as defined in claim 1 having a ratio of $ZnO/SiO_2$ within a range from 3.303 to 3.7 and having the weathering resistance (surface method) of Class 1.

4. The optical glass as defined in claim 1, wherein the optical glass comprises, in mass %:

| | |
|---|---|
| $SiO_2$ | 6-7.872%, |
| $B_2O_3$ | 12-24%, |
| $La_2O_3$ | 26-42%, |
| $ZrO_2$ | 1.5-10%, |
| $Nb_2O_5$ | 1-10%, |
| $Ta_2O_5$ | 1-15%, |
| $WO_3$ | 1-10%, |
| ZnO | 19.818-26%, and/or |
| $Li_2O$ | 0.6-4%. |

5. The optical glass as defined in claim 1, further comprising, in mass %: in total less than 4% of one or more of

| | |
|---|---|
| $Gd_2O_3$ | less than 4%, |
| $GeO_2$ | less than 4%, |
| $Al_2O_3$ | less than 4%, |
| $TiO_2$ | less than 4%, |
| RO | less than 4%, |
| where RO is one or more components selected from the group consisting of MgO, CaO, SrO and BaO, and | |
| $Sb_2O_3$ | 0-1%. |

6. An optical glass according to claim 1, wherein the optical glass comprises, in mass %:

| | |
|---|---|
| $SiO_2$ | 6-7.872%, |
| $B_2O_3$ | 12-24%, |
| $La_2O_3$ | 26-42%, |
| $ZrO_2$ | 1.5-10%, |
| $Nb_2O_5$ | 1-10%, |
| $Ta_2O_5$ | 1-15%, |
| $WO_3$ | 1-10%, |
| ZnO | 19.818-26%, |
| $Li_2O$ | 0.6-4%, |
| $Gd_2O_3$ | less than 4%, |
| $GeO_2$ | less than 4%, |
| $Al_2O_3$ | less than 4%, |
| $TiO_2$ | less than 4%, |
| RO | less than 4%, |
| where RO is one or more components selected from the group consisting of MgO, CaO, SrO and BaO, and | |
| $Sb_2O_3$ | 0-1%. |

7. The optical glass as defined in claim 1, wherein the optical glass is included in a lens preform.

8. The optical glass as defined in claim 7, wherein the optical glass is included in an optical element.

9. The optical glass as defined in claim 1, wherein the optical glass is included in an optical element formed by precision press molding.

* * * * *